2,845,428

PROCESS FOR THE MANUFACTURE OF PYRIDINE CARBOXYLIC ACIDS

Walter Wettstein, Muenchenstein, Switzerland, assignor to Ciba Limited, Basel, Switzerland, a Swiss firm No Drawing. Application June 14, 1956
Serial No. 591,270

Claims priority, application Switzerland June 16, 1955

9 Claims. (Cl. 260—295)

Pyridine carboxylic acids are usually made by oxidizing homologues of pyridine with nitric acid, a mixture of nitric acid and sulfuric acid, potassium permanganate, potassium bichromate or sodium bichromate in an aqueous medium. The reaction products must then be isolated from the aqueous reaction mixture, which may contain strong sulfuric acid and nitric acid, and this necessitates costly operations in view of the solubility in water of pyridine carboxylic acids and their amphoteric nature.

The present invention is based on the observation that under suitable conditions and with the use of a suitable oxidation catalyst homologues of pyridine can be catalytically oxidized with air in the vapor phase to form the corresponding carboxylic acids, which can be isolated in a simple manner from the reaction mixture.

Proposals of this character have already been made, especially in U. S. Patent No. 2,437,938, in Example 1 of which is described a process in which $\beta$-picoline is oxidized to nicotinic acid by passing it over a catalyst consisting of silica gel and vanadium pentoxide at about 400° C. at a space velocity of about 1000. This process has not been used commercially for the manufacture of nicotinic acid. The reason for this will be readily understood when that process is compared with the process described in German Patent No. 733,298. In the latter process a homologue of pyridine is passed at 380° C. in admixture with air over a catalyst which is wholly analogous to that described in the United States specification, and the higher pyridine is merely degraded to a lower pyridine. By using a similar catalyst, which consists of molybdic acid precipitated on silica gel, there are obtained from $\alpha$- and $\beta$-picoline about 40 percent of pyridine and only about 3 percent of nicotinic acid.

Accordingly, it would seem that both the catalyst and also the reaction conditions used in the aforesaid process are unsuitable for making pyridine carboxylic acids. The process of the present invention differs fundamentally from the aforesaid processes with respect to the catalyst used and also the working conditions.

Thus, it has been found that the degradation of the pyridine carboxylic acids to pyridines can be suppressed to a very great extent by incorporating with the vanadic acid precipitated on silica gel a strongly acid activator, such as sulfuric acid, phosphoric acid and especially potassium bisulfate, and by working at a temperature below 350° C., and advantageously below 300° C., and preferably at about 260–270° C.

Accordingly, the present invention provides a process for the manufacture of pyridine carboxylic acids by passing a mixture of air and a pyridine homologue, including quinoline and homologues thereof, over a vanadium pentoxide catalyst supported on silica gel, wherein the catalyst used contains an acid activator and the temperature is below 350° C.

It has also been found that the nature of the silica gel has an important influence on the course of the reaction, in that large pored silica gels are far better as supports than finely porous gels. It has also been found advantageous to add steam to the air used for oxidation, the proportion of the steam amounting to several times the weight of the pyridine homologue, and advantageously about 10 times that weight. The space velocity is, of course, adjusted to suit the other conditions, and is advantageously so chosen that the whole of the pyridine homologue does not react, so that a part of it, advantageously about 5–30 percent, remains unchanged. This is the case at space velocities of about 100–400, and advantageously about 200, and when the above mentioned low temperatures are used (space velocity means the total gas quantity which in one hour passes through the catalyst measured at ordinary temperature and pressure, divided by the volume of the catalyst used).

Accordingly, the reaction conditions and also the catalyst differs considerably from those used in the aforesaid known processes, and enable, for example, nicotinic acid to be obtained from so-called aldehyde-collidine in yields amounting to about 80–90 percent of the theoretical yield. The products are obtained in a state of very high purity and can be used as such.

The following examples illustrate the invention, the parts and percentages being by weight unless otherwise stated, and the relationship of parts by weight to parts by volume being the same as that of the kilogram to the liter:

Example 1

4.1 parts of ammonium metavanadate are introduced into a mixture of 50 parts by volume of water, 25 parts of potassium sulfate, 4.7 parts of crystalline oxalic acid and 7.45 parts by volume of concentrated sulfuric acid at about 50° C. while stirring, and the mixture is slowly heated to about 75° C. until a clear blue solution is obtained.

The solution is poured on to 50 parts of large-pored silica gel prepared as described in the FIAT Final Report No. 1313, pages 394–398, and having a particle size of 1–3 mm., and the mixture is allowed to stand for about 2 hours at about 50° C. The particles are then dried at 80° C. and roasted in a current of air at about 260° C. The small amount of finely powdered constituents present is removed by sieving through a sieve of 1 mm. mesh, and then the catalyst is ready for use.

80 parts by volume of the catalyst so prepared are charged into a catalyst tube, which has been immersed in a molten salt bath heated at 265° C. A current of air, which has previously been passed through a mixture of aldehyde-collidine (2-methyl-5-ethylpyridine) and water heated at 43° C., is then passed through the catalyst tube at the rate of 19,200 parts by volume per hour. The gases issuing from the tube are first cooled in a condenser to about 50° C. and then freed from unchanged collidine by washing them in a washing flask with dilute hydrochloric acid. The resulting nicotinic acid separates out in the condenser in a remarkably pure state. Under the conditions described above 0.180 part of collidine and about 2 parts of water are evaporated per hour. 0.114 part of nicotinic acid is formed per hour, and 0.048 part of unchanged collidine is recovered in the washing flask. The yield amounts to 85 percent of the theoretical yield.

Example 2

Air, which has been saturated with $\beta$-picoline at 29° C. and then passed through water heated at 65° C., is passed at the rate of 20,400 parts by volume per hour through the catalyst tube containing 80 parts by volume of the catalyst described in Example 1, the tube being heated to 290° C. 0.192 part of $\beta$-picoline and about 2 parts of water are evaporated per hour. 0.0550 part of nicotinic acid crystallizes out in the condenser per hour, and 0.1165 part of $\beta$-picoline is recovered per hour from the issuing gases by means of the washing acid. This corresponds to a yield of 50 percent of the theoretical yield.

Nicotinic acid is also obtained by the above procedure when the air is passed through a mixture of quinoline and water heated to 65° C., instead of through the β-picoline and water.

*Example 3*

Air, which has been saturated with γ-picoline at 28° C. and subsequently passed through water heated to 65° C., is passed at the rate of 49,200 parts by volume per hour through the catalyst tube described in Example 2, which is heated to 265° C. 0.5844 part of γ-picoline and about 5.8 parts of water are evaporated per hour. 0.555 part of isonicotinic acid crystallizes out in the condenser, and 0.0585 part of γ-picoline is recovered per hour by means of the washing acid. This corresponds to a yield of 80 percent of the theoretical yield.

What is claimed is:

1. Process for the manufacture of a pyridine carboxylic acid, which comprises passing a mixture of air and a homolog of pyridine over a vanadium pentoxide catalyst supported on silica gel and containing as non-volatile acidic activator a member selected from the group consisting of sulfuric acid, phosphoric acid and bisulfates of alkali-forming metals, at a temperature below 350° C.

2. Process for the manufacture of a pyridine carboxylic acid, which comprises passing a mixture of air and a homolog of pyridine over a vanadium pentoxide catalyst supported on silica gel and containing potassium bisulfate as an activator at a temperature between 250 and 300° C.

3. Process for the manufacture of a pyridine carboxylic acid, which comprises passing a mixture of air, of a homolog of pyridine and of water vapor, the quantity of the latter being substantially in excess of the quantity of the pyridine homolog, over a vanadium pentoxide catalyst supported on silica gel and containing potassium bisulfate as an activator at a temperature between 250 and 300° C.

4. Process for the manufacture of nicotinic acid, which comprises passing a mixture of air, of 2-methyl-5-ethylpyridine and of water vapor, the quantity of the latter being substantially in excess of the quantity of 2-methyl-5-ethylpyridine over a vanadium pentoxide catalyst supported on silica gel and containing potassium bisulfate as an activator at a temperature between 250 and 300° C.

5. Process for the manufacture of nicotinic acid, which comprises passing a mixture of air, of 2-methyl-5-ethylpyridine and of water vapor, the quantity of the latter being substantially in excess of the quantity of 2-methyl-5-ethylpyridine over a vanadium pentoxide catalyst supported on silica gel and containing potassium bisulfate as an activator at a temperature of about 265° C.

6. Process for the manufacture of nicotinic acid, which comprises passing a mixture of air, of β-picoline and of water vapor, the quantity of the latter being substantially in excess of the quantity of β-picoline, over a vanadium pentoxide catalyst supported on silica gel and containing potassium bisulfate as an activator at a temperature between 250 and 300° C.

7. Process for the manufacture of nicotinic acid, which comprises passing a mixture of air, of β-picoline and of water vapor, the quantity of the latter being substantially in excess of the quantity of β-picoline, over a vanadium pentoxide catalyst supported on silica gel and containing potassium bisulfate as an activator at a temperature of about 290° C.

8. Process for the manufacture of isonicotinic acid, which comprises passing a mixture of air, of γ-picoline and of water vapor, the quantity of the latter being substantially in excess of the quantity of γ-picoline, over a vanadium pentoxide catalyst supported on silica gel and containing potassium bisulfate as an activator at a temperature between 250 and 300° C.

9. Process for the manufacture of isonicotinic acid, which comprises passing a mixture of air, of γ-picoline and of water vapor, the quantity of the latter being substantially in excess of the quantity of γ-picoline, over a vanadium pentoxide catalyst supported on silica gel and containing potassium bisulfate as an activator at a temperature of about 265° C.

References Cited in the file of this patent

UNITED STATES PATENTS

| | | |
|---|---|---|
| 2,206,377 | Weiss | July 2, 1940 |
| 2,432,642 | Woodward et al. | Dec. 16, 1947 |
| 2,437,938 | Cislak et al. | Mar. 16, 1948 |
| 2,456,380 | Cislak et al. | Dec. 4, 1948 |

FOREIGN PATENTS

| | | |
|---|---|---|
| 563,274 | Great Britain | Aug. 8, 1944 |